W. Rhoads, Jr. & T. Gerhard,

Cheese Cutter,

N° 70,020.    Patented Oct. 22, 1867.

Witnesses:  
Theo. Insche  
W. Trewin

Inventors:  
Wm Rhoads  
T. Gerhard  
per Munn & Co.  
Attorneys.

United States Patent Office.

WILLIAM RHOADS, JR., AND TIRAS GERHARD, OF READING, PENNSYLVANIA.

Letters Patent No. 70,020, dated October 22, 1867.

IMPROVED MACHINE FOR CUTTING CHEESE.

*The Schedule referred to in these Letters Patent and making part of the same.*

TO ALL WHOM IT MAY CONCERN:

Be it known that we, WILLIAM RHOADS, Jr., and TIRAS GERHARD, of Reading, in the county of Berks, and State of Pennsylvania, have invented an improved Machine for Cutting Cheese and other articles; and we do hereby declare that the following is a full, clear, and exact description thereof, which will enable others skilled in the art to make and use the same, reference being had to the accompanying drawings, forming part of this specification.

This invention relates to a new and improved method of cutting or slicing such articles as cheese, bread, dried beef, &c.; and it consists in operating a cutting knife by a rack and pinion, and also in revolving a table by means of gearing in connection with the knife, as will be hereinafter described.

Similar letters of reference indicate corresponding parts.

Figure 1:
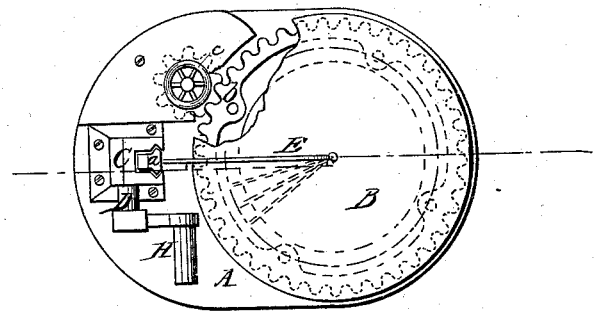
Figure 1 is a top or plan view of the machine, showing the manner in which the table is revolved, and the crank by which the knife is operated.
Figure 2:
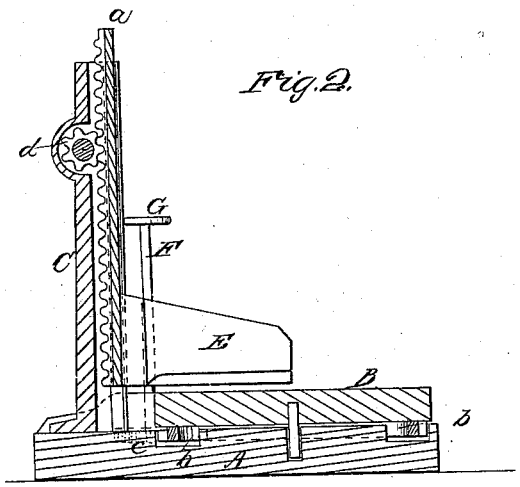
Figure 2 is a sectional side view, showing the knife and the rack and pinion, the section being through the line $x$ $x$ of fig. 1.

A is the bed-piece by which the parts of the machine are supported; B represents the table; C is a standard which supports the rack in a vertical position, and through which the pinion-shaft passes; D is the pinion-shaft; E is the knife. In this example of our invention the knife is operated in a vertical position, while the table which supports the article to be cut is horizontal. It will at once be seen that this order can be reversed if desired, or they may both be operated in an inclined position. The table turns on a pivot in its centre, and on its under side there is a cog-wheel, as seen in dotted lines in fig. 1. This cog-wheel is marked $b$. $c$ is a pinion-wheel which is attached to the lower end of the shaft F. The table is revolved by turning the shaft with the hand-wheel G. $a$ represents the rack which works up and down in a recess and in guide-ways in the stand C, as seen in the top view or cross-section in fig. 1. The pinion which operates the rack is secured to the shaft D, in a recess in the standard, as seen in fig. 2. The knife E is attached to the rack $a$, and of course plays up and down with it. The rack is operated by turning the shaft D with the crank H. The operation of the machine will be readily understood from the drawing.

Having thus described our invention, what we claim as new, and desire to secure by Letters Patent, is—

The revolving table B, when provided with the cog-wheel $b$, operated by means of the pinion $c$ attached to the shaft F, in combination with the rack $a$, knife E, and pinion $d$ upon the shaft D, as herein shown and described.

WILLIAM RHOADS, JR.,
TIRAS GERHARD.

Witnesses:
J. DALLAS SCHOENER,
CHARLES S. BUTLER.